United States Patent
Klippstein et al.

(10) Patent No.: US 10,089,903 B2
(45) Date of Patent: Oct. 2, 2018

(54) METHOD FOR THE SECURE TRANSMISSION OF ENCRYPTED INFORMATION

(71) Applicant: siOPTICA GmbH, Jena (DE)

(72) Inventors: Markus Klippstein, Jena (DE); Uwe Schroeter, Dornburg-Camburg (DE); Juergen Schwarz, Apolda (DE)

(73) Assignee: SIOPTICA GMBH, Jena (DE)

( * ) Notice: Subject to any disclaimer, the term of this patent is extended or adjusted under 35 U.S.C. 154(b) by 193 days.

(21) Appl. No.: 15/315,701

(22) PCT Filed: Jun. 2, 2015

(86) PCT No.: PCT/EP2015/062260
§ 371 (c)(1),
(2) Date: Feb. 22, 2017

(87) PCT Pub. No.: WO2015/185552
PCT Pub. Date: Dec. 10, 2015

(65) Prior Publication Data
US 2017/0193859 A1    Jul. 6, 2017

(30) Foreign Application Priority Data

Jun. 2, 2014   (DE) .................. 10 2014 107 699

(51) Int. Cl.
*G09C 1/12*     (2006.01)
*G09C 5/00*     (2006.01)
(Continued)

(52) U.S. Cl.
CPC ............ *G09C 5/00* (2013.01); *B42D 25/328* (2014.10); *G06F 21/42* (2013.01); *G06T 5/002* (2013.01);
(Continued)

(58) Field of Classification Search
CPC ........ G09C 5/00; B42D 25/328; G06T 5/002; H04L 9/3215; H04L 63/18; H04L 2209/56; G06F 21/42
(Continued)

(56) References Cited

U.S. PATENT DOCUMENTS

2014/0136836 A1    5/2014   Huang et al.

OTHER PUBLICATIONS

Yamamoto, H., et al., "Secure information display by use of composite visual cryptography of a secret image and identification images," *IDW/AD*, VHF1-5, pp. 793-796 (2005).

*Primary Examiner* — Mohammad W Reza
(74) *Attorney, Agent, or Firm* — Christensen, Fonder, Dardi & Herbert PLLC (57) ABSTRACT

A method for secure transmission and visualization of encrypted information. A first grid of first and second element types is applied to a first medium. The types differently modify a property of light through the medium. A key defined by element distribution is determined. A second grid with different light-modifying element types is applied to a second medium. A second-grid contoured area defines an information item. Second-grid elements are distributed such that a first-grid element of the second type corresponds to a second-grid element of the first type, a first-grid element of the first type corresponds to a second-grid element of the second type outside the area, and a first-grid element of the second type corresponds to a second-grid element of the second type, and a first-grid element of the first type corresponds to a second-grid element of the first type inside the area. Grid superimposition makes the information visible.

22 Claims, 2 Drawing Sheets

(51) Int. Cl.
    *G06F 21/42* (2013.01)
    *H04L 29/06* (2006.01)
    *H04L 9/32* (2006.01)
    *B42D 25/328* (2014.01)
    *G06T 5/00* (2006.01)
(52) U.S. Cl.
    CPC ............ *H04L 9/3215* (2013.01); *H04L 63/18* (2013.01); *H04L 2209/56* (2013.01)
(58) Field of Classification Search
    USPC .......................................................... 380/54
    See application file for complete search history.

METHOD FOR THE SECURE TRANSMISSION OF ENCRYPTED INFORMATION

PRIORITY CLAIM

The present application is a National Phase entry of PCT Application No. PCT/EP2015/062260, filed Jun. 2, 2015, which claims priority from German Patent Application Number 102014107699.0, filed Jun. 2, 2014, the disclosures of which are hereby incorporated by reference herein in their entirety.

FIELD OF THE INVENTION

The invention relates to a method for the secure transmission of encrypted information and for visualization by a specified recipient.

BACKGROUND OF THE INVENTION

Where information is transmitted to a selected recipient, it is becoming increasingly important nowadays to adequately protect this information in order to prevent it from being wrongfully used by third parties. This concerns, e.g., information to be displayed on screens and to be seen by selected viewers only, such as, e.g., engineering drawings exclusively intended to be displayed by selected monitors in a company's internal network; the input of so-called PIN codes at payment terminals and automated teller machines; or the transmission of transaction numbers for banking transactions (TAN); especially, it concerns the transmission of personal identification numbers (PIN), which are required, e.g., to use bank or credit cards, or to enable SIM (Subscriber Identity Module) cards for cellular phones.

In banking transactions, for example, so-called mobile TANs—in some countries called OTPs (Online Transaction PINs or One-Time-Passwords) are frequently transmitted by SMS; the user then needs to enter them in a certain box on a display connected to, or integrated with, a terminal. It is possible, however, for a so-called man in the middle to interfere with the transmission of the SMS or its display on the recipient's screen, since SMSs are usually not encrypted. Where PINs are supplied, these are usually mailed to the recipient, who will find the PIN, e.g., under a scratch-off layer or a strip-off label. The PIN itself, though, is not encrypted, which makes it easier to misuse by a third person who intercepts the mail.

For this reason it is desirable to encrypt and transmit such information in such a way that the probability of it being decrypted and read by persons other than the intended recipient is kept as slim as possible.

SUMMARY OF THE INVENTION

This problem is solved by a method of the type described at the start in such way that a first grid consisting of a first type of first grid elements and a second type of first grid elements is applied to a first medium. The first medium is always transparent, i.e., light can pass it. The first type and the second type of first grid elements differ, however, in that they differently modify at least one property of light passing the first grid or the first medium. For example, the first type and the second type of first grid elements may differently modify the intensity, the polarization, the direction of light propagation—e.g., due to diffraction effects—and/or the spectral range of transmitted light.

Here, the first and the second type of the first grid elements are distributed statistically rather than regularly, with the number of the first type and the number of the second type of first grid elements being related at a ratio of about 50:50, i.e., being distributed approximately evenly. This distribution, then, defines a key for the information to be encrypted, i.e., encryption is performed graphically. Here it is essential that the modulation, or distribution, is done in such a way that the ratio between first grid elements of the first type to first grid elements of the second type is about 1:1, with deviations of up to 5% being within the tolerance range. Greater deviations, however, will cause a decrease in security.

Then, a second grid consisting of a first type of second grid elements and a second type of second grid elements is applied to a second medium. Here, the second grid elements have essentially the same lateral dimensions—height and width—as the first grid elements, which is important for a later superimposition of the two grids in alignment with each other. When illuminated, the first type and the second type of second grid elements modify in different ways at least one property of the light used for illumination. The light used for illumination can be radiated, reflected or transmitted by the second grid, and will be modified by the second grid elements in different ways. For example, the first type and the second type of second grid elements can, when illuminated, differently modify the intensity, the polarization, the direction of light propagation and/or the spectral range of the light used for illumination.

The first type and the second type of second grid elements are distributed as a function of the distribution of the first type and the second type of first grid elements. Before the second grid elements are applied to the second medium, however, at least one coherent area whose contour defines an item of information is defined in the second grid. If a PIN or TAN is to be transmitted, at least one coherent area is required for each digit or character, respectively, of the TAN or PIN, with a first area defining, e.g., the digit "4", another area the digit "7", a third and a fourth area the lower-case letter "i", etc.

Also, the confidential information may simply serve as a confirmation that both grids, or both media, come from the same source. Thus, the recipient can check, e.g., whether documents and/or files and/or things come from the expected source.

The first and the second type of second grid elements are then distributed as a function of the distribution of the first grid elements in the first grid, in such a way that, with a predefined mutual orientation of the two grids, outside the at least one coherent area a first grid element of the second type corresponds to a second grid element of the first type, and a first grid element of the first type corresponds to a second grid element of the second type. Within the at least one coherent area, things are exactly the other way round, i.e., a first grid element of the second type corresponds to a second grid element of the second type and a first grid element of the first type corresponds to a second grid element also of the first type. The correlation of the first grid elements and the second grid elements may also be reversed, so that, with a predefined mutual orientation of the two grids, outside the at least one coherent area a first grid element of the second type corresponds to a second grid element of the second type, and a first grid element of the first type corresponds to a second grid element of the first type, whereas within the at least one coherent area a first grid element of the second type corresponds to a second grid element of the first type and a first grid element of the first type corresponds to a second grid element of the second type.

If the two grids are aligned with each other in the predefined manner and superimposed, the information will be visible exclusively because of a difference created as a function of the different modifications, e.g., a difference in polarization, color, brightness and/or contrast between the at least one coherent area and the surroundings outside this area. Alignment may be effected, e.g., by means of marks provided on the media outside the grid or according to given correlation instructions, if at least one of the two media can be positioned by electronic control.

It is an essential step of the procedure to make the first grid accessible to the recipient via a first transmission path and the second grid via a second transmission path. The first transmission path differs from the second transmission path in at least one respect, either in terms of time, space or type. Naturally, a combination of several distinctive features is possible as well.

The invented method ensures in two ways that only the intended recipient can actually read the information. First, the information is encrypted graphically. As the grid elements are distributed stochastically at a ratio of 1:1, they are still distributed stochastically at a ratio of 1:1 after part of them have been inverted, so that a person in possession only of the key in the form of the first medium with the first grid applied to it, or in possession only of the second medium with the second grid, will discern only a stochastical distribution of two types of grid elements, with the two types differing, e.g., in color or brightness, or in their capability to vary the polarization, the polarization direction and/or the direction of light propagation of the transmitted light, but that person cannot readily draw any conclusions as to the information transmitted. At first sight, he or she cannot even discern any significant difference between the first grid and the second grid.

In a particularly preferred embodiment of the invention, the key-defining statistical distribution of the first and the second type of the first grid elements in the grid's rows and columns is effected on the marginal condition that in each row, each column and/or each diagonal—relative to one row and one column each, i.e., the diagonal between these—the number of adjacent grid elements of the same type must not exceed a specified maximum. This makes sure that—with an appropriate maximum selected—no accidental clusters of first grid elements of the same type will form. On reaching a certain size, such clusters would be macroscopic, i.e., visible with the naked eye, and, if being of an untoward type, they would reduce contrast, since outside the at least one coherent area they would show up, e.g., as irritating patches if the grid elements differ in color The introduction of the marginal condition efficiently prevents the formation of such clusters, because during the creation of the key a check is made with each grid element whether the maximum has been reached. On the other hand, the maximum specified must not be as small as to allow a checkerboard pattern as the only solution, i.e., a pattern in which the first grid elements of the first and the second type alternate in each direction—row, column and/or diagonal.

On the market, a great number of displays are available, which differ in resolution. What is particularly important in that connection is their pixel size and the viewing distance; the values differ, e.g., for TV sets, PC displays and cell phone screens. Therefore, the maximum is preferably defined as a function of the lateral extensions of a single grid element—i.e., in the directions in which the rows and/or columns are arranged—and a specified viewing distance of the receiving user. If the lateral or vertical extensions along the rows and columns differ, one can define differing maxima along the rows and columns; selection of a mean maximum is also possible.

The critical cluster size $B_{krit}$ results from the viewing distance $d_{OB}$ and the viewing angle $\sigma$, which at the best possible viewing distance should not be greater than one minute of arc:

$$B_{krit} \leq d_{OB} \cdot \tan \sigma$$

Several makes of modern displays, so-called retina displays, in which the lateral dimension of the grid elements is 0.096 mm, the maximum for a viewing distance of $d_{OB}=40$ cm is, e.g., between 1 and 2, which is commonly rounded to the higher integral figure, i.e., 2.

The critical cluster size $B_{krit}$ becomes particularly significant if at least two different maxima, or critical cluster sizes $B_{krit1}$ and $B_{krit2}$, respectively, are used that are distributed across the grid, i.e., with a first maximum in one share of areas and a second maximum in the remaining share of areas. Here, preferably one lays a wrong track to encrypted information by defining pseudoinformation across areas on the grid, which then is implemented, e.g., with the cluster size $B_{krit1}$, whereas one would use cluster size $B_{krit2}$ for the areas surrounding the pseudoinformation. In this way, there is a high probability that a decryption attack, e.g., one analyzing the cluster density on the grid, would first find the pseudoinformation. Pseudoinformation may contain, e.g., digits, letters or, generally, alphanumerical characters or other symbols. In case of the information transmission of a four-digit PIN number according to the invention, the pseudoinformation would then preferably be a four-digit number different from that to be actually transmitted.

The lateral extension of grid elements in height and width may range, e.g., from 0.01 millimeter up to a few millimeters, depending on the configuration. Other dimensions are possible as well.

In an alternative version, the key-defining statistical distribution of the first and the second type of the first grid elements in the grid's rows and columns is made with the marginal condition that in each row, each column and/or each diagonal—relative to one row and one column each, i.e., the diagonal between these—the number of adjacent grid elements of the same type must not fall below a minimum. Due to coarser structures, this makes it easier also for less dexterous users to align the grids with each other. Here, the minimum is, e.g., greater than the maximum described in connection with the first alternative.

A combination of specifying both a minimum and a maximum is possible, with the minimum being smaller than the maximum. The combination can efficiently prevent the formation of checkerboard structures.

The certainty that only the intended recipient gets into possession of both the key in form of the first medium with the first grid, and the information in form of the second medium with the second grid is further increased by selecting two different transmission paths. For example, transmission by SMS can be selected as the first transmission path, and transmission via the internet as the second transmission path. Further, the media can be stored on different carrier materials and sent to the recipient at different times, from different places and by mail, if necessary.

In a favorable embodiment of the invention, the first transmission path is an analog one, e.g., with resort to a postal or courier service, with the first grid being configured as a medium and integrated in a bank or credit card or at least dispatched together with it. The second transmission path may then be, e.g., a digital one such as transmission via SMS or the internet.

The two media may also be image files having the same dimensions, which are transmitted to the recipient via different transmission paths—e.g., MMS and E-Mail—and which are superimposed pixel by pixel in an additive or subtractive manner and combined to form a composite image by means of suitable graphic software, with both image files having identical dimensions in terms of pixels and implicitly already being aligned with each other. Each pixel is assigned a color value.

The image file—especially for the second grid—may be configured as a kind of metainformation or metafile, or a series of metainformation items or metafiles, to be sent by way of one or several SMS messages. At the recipient's end, a matching software application re-converts the metafile(s) or metainformation items into a genuine image file again.

If the distribution of the first grid elements of the first and the second type is brought about in compliance with the above-mentioned marginal condition, this version, which can be implemented by means of software alone, offers the added capability to further increase contrast in this way: In such image areas of the composite image in which the marginal condition is satisfied—even after superimposition of the two grids, since similar grid patterns are superimposed outside the at least one coherent, information-carrying area—, the color values assigned to the pixels are set to a uniform background color value that deviates from the color value of the pixels in the at least one coherent area of the composite image. If the two types of grid elements differ in color, with one type being black and the other white, an additive superimposition in the coherent area produces the value "black". Accordingly, the background color value in the image areas mentioned is set to "white".

The user is not restricted to the combination of these two color values: every conceivable color is possible, although it is expedient to choose colors providing a contrast as striking as possible.

If image files are used, it is always possible also to scale one or both files to a substantially higher resolution than that of the display screen, the resolution of which does not matter in this case. Scaling to the resolution of the display screen is effected after the composite image has been created and adjusted to enhance contrast as described above, although the last-mentioned step may also be executed after scaling.

If pixels are used in image files, one pixel each as a rule corresponds to one first or second grid element of the first or second type, if both image files have the same number of pixels in height and width. However, the invented method also allows the use of image files having differing pixel dimensions. For this purpose, decryption is achieved by scaling the larger image to the dimension of the smaller one, in which case a grid element of the larger image comprises several pixels according to the scaling factor. In encryption, this process takes place exactly in the reverse way, so that the pixels corresponding to a grid element are all of the same kind. As an alternative, alignment of the two image files in superimposition can be achieved by simply cutting off areas outside the smaller file, by using a predefined image area punched out of the larger image, this punched-out area having the size of the smaller image and a grid arrangement containing the information to be transmitted.

For decryption, scaling the larger image to the dimension of the smaller one can be of advantage also if, due to the transmission and/or display paths, the two grids no longer have the same size. This is the case, e.g., if the second grid is displayed on a screen whose grid size differs from that of the first grid. It is necessary then to scale the grid elements of both grids to essentially the same size. This works even if only one of the grids is a display screen while the other grid comprises a fixed medium. If, therefore, the grid elements of both grids have different sizes due to the transmission and/or display paths, the grid elements of at least one grid are scaled to essentially the same size as the grid elements of the other grid. In other words, the grid elements of at least one of the two grids are scaled to essentially the size of the grid elements of the other grid if the grid elements of the two grids differ in size due to the transmission and/or display paths. In principle, it suffices to scale the grid elements of one of the grids, but one can also scale the grid elements of both grids, e.g., to a common mean size.

Moreover, it is possible for parts of the image file to be punched out by software and/or rotated by a defined angle, prior to decryption. Rotating the entire image file is possible as well. The rotation angles, or the punching locations, respectively, can be varied in time to further impede spying.

Eligible as a first medium and as a second medium are, e.g., LED/LCD or OLED screens, as well as all kinds of flat-panel displays. For example, the second medium may be the LED/LCD screen of a mobile phone or computer, while the first medium may be an additional transparent OLED screen that is arranged in front of the LED/LCD screen and connected, either permanently or via docking means, to the mobile phone or a computer monitor, from which it receives its power supply and its control commands.

As far as the information to be transmitted is transmitted electronically, it can first be encrypted with an additional key, and before or while the information is applied to the second grid it can be decrypted with the additional key. This makes for increased security. Furthermore, protected transmission paths can be used.

The first medium, e.g., the transparent OLED display, can be configured to have a height substantially lower than that of a common LED/LCD display, and thus can be used to advantage as the first medium. The second medium, then, can be an LED/LCD screen or a—non-transparent—OLED display, for example.

For implementing the grid elements, one can then use the pixel or subpixel structures of the screens. In a simple embodiment, the second type of second grid elements attenuates the light intensity to a lower level than does the first type of second grid elements, so that the first type of second grid elements, when illuminated, looks brighter than the second type of second grid elements. To this end, e.g., pixels or subpixels of the LED/LCD screen that are switched to be transparent can be used for implementing the first type of second grid elements, and pixels or subpixels of the LED/LCD screen that are switched to be opaque can be used for implementing the second type of second grid elements. The information to be displayed on the first medium can be dubbed, e.g., to the control unit of the screen via a data carrier; transmission per e-mail is possible as well. The OLED screen as a first medium can obtain the key from the internet, e.g., by calling it from a special server. Such a key can, in addition, be varied, so that a key can be used, e.g., for a single operation only in connection with the data, whereas for the next operation the key is changed. For example, a user can be sent a graphically encrypted TAN/OTP/PIN or another password by e-mail or SMS. This graphically encrypted TAN can be saved as a file to be opened in a special application that triggers the OLED screen connected upstream and causes it to display a particular grid. Here again, it is preferable for the second type of first grid elements to attenuate the intensity of transmitted light to a lower level than the first type of first grid elements, as this is particularly easy to implement. Similarly easy to do is a modification of the spectral range. In a particularly simple embodiment, the first type of first grid elements is transparent, and the second type of first grid elements is opaque.

The OLED screen is then triggered accordingly, and, in accordance with the appropriate key called from the internet, the pixels of the OLED screen are switched to be, e.g., opaque or transparent, or white or blue, respectively.

In addition, one of the two grids may be integrated in a bank or credit card.

In the case just described, both the first medium and the second medium can be triggered, which enhances security because the key can be varied.

In another embodiment of the invention, the first medium is preferably a static one, e.g., a transparent sheet, possibly with a suitable grid printed on it, or a photographic film previously exposed to a suitable mask structure. Here again, in the simplest case, the second type of first grid elements attenuates the intensity of transmitted light to a lower level than the first type of first grid elements. For example, the first type of first grid elements can be transparent, possibly combined with a selection of the spectral range, while the second type of first grid elements is opaque. As an alternative, several spectral ranges can be selected, if, e.g., a color film or a multicolor-print transparent sheet is used.

In the case of a first grid physically forming a medium, this can be integrated, e.g., in a credit or bank card, too. In this case, as also in case of some other physical filter, this would be placed onto the screen and aligned, e.g., with the aid of positioning marks provided in both grids in an either identical or complementary fashion, in order to decrypt the encrypted information.

Furthermore, in a first grid physically forming a medium, both the first and the second types of grid elements may be designed, e.g., as optical deflectors, which influence the light's direction of propagation by dispersion and/or diffraction and/or refraction. For this purpose, convex and/or concave microlenses made of polymers are eligible, for example.

Such static first media can even be retrofitted to commercially available display screens of mobile phones or computers, either permanently or temporarily, with the transparent sheets or films optionally integrated in frames—e.g., in a bank or credit card—, by means of which they can be connected to the display screen in a defined, aligned position. In this case, the screen is encoded accordingly. The transparent sheet or the film, or more generally, the static first medium can even be integrated in the assembly during the manufacture of the display screens, and it can be arranged in front of or behind the screen as seen in the viewing direction, as far as the light source is arranged, e.g., behind the two media as seen in the viewing direction, rather than laterally, or as far as no light source is provided at all, as in case of, e.g., OLED screens.

In another embodiment of the invention, both the first medium and the second medium are not of a dynamic design as described above, but of a static design, i.e., they cannot be triggered. In that case one can use, e.g., paper or some other printable material as a second medium and print the second grid thereon. The first type of second grid elements, then, is preferably white or of the hue of the paper, while the second type of second grid elements is black or some other color. This approach suggests itself especially if, e.g., PINs are dispatched by postal services. In this case it is expedient that the first medium with the first grid be made accessible to the recipient on the first transmission path, and that the second medium with the second grid applied to it be made accessible to the recipient on the second transmission path. Thus, e.g., the first medium with the filter structure is sent together with, e.g., a bank or credit card or an SIM card, in a first letter. The filter structure is provided with marks, such as, e.g., a printed frame later to be used for alignment with the first grid. The graphically encrypted information is then sent with a second letter, which information can be printed onto the paper and also provided with marks for alignment, e.g., a frame equivalent to that of the second medium with the second grid. Here, the transmission paths differ with regard to time and place, if the same postal service is employed; however, the two letters can also be sent via different postal services. Preferably, the first medium is sent via a postal service, whereas the second medium is, e.g., printed out on paper by the recipient after a download or after the receipt of an e-mail with an image file.

At the recipient's end, the information becomes visible only when the recipient superimposes the first medium with the first grid on the second medium with the second grid. The key applied to the first medium in the form of the first grid is unique and is used only in this particular case. Every recipient gets a different key, so that it is ensured in the highest possible degree that the key and the respective information will indeed be received only by the right addressee. An unauthorized person who would intercept and open one of the two letters cannot use the patterns found therein in any way.

It is understood that, within the scope of the present invention, the features mentioned above and those explained below are applicable not only in the combinations stated but also in other combinations or as stand-alone features.

BRIEF DESCRIPTION OF THE DRAWINGS

Below, the invention will be explained in more detail with reference to the accompanying drawings, which also show features essential to the invention, among others, and in which.

DETAILED DESCRIPTION OF THE DRAWINGS

Described below is a method for the secure transmission of encrypted information to be visualized by a specified recipient. For this purpose, a first grid consisting of a first type of first grid elements and a second type of first grid elements are applied to a first medium. The first and the second type of first grid elements modify in different ways at least one property of light transmitted by the grid or medium.

Figure 1:
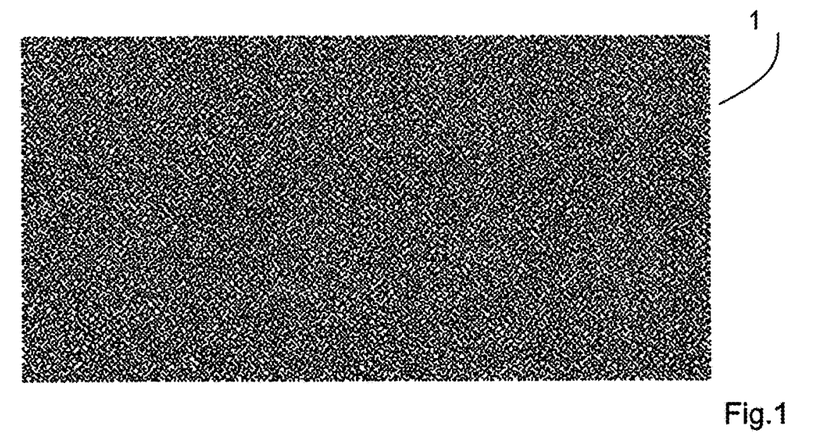
FIG. 1 shows a first grid.

Such a first grid is shown in FIG. 1. This grid can be of a static kind, e.g., and applied to a film or a transparent sheet as a first medium. Alternatively, it can be created dynamically on a triggerable, very thin, transparent display screen such as a transparent OLED screen, with the OLED screen being arranged in front of or behind the display screen proper (as seen in the viewing direction). In the present case, let the first grid 1 be applied to a thin transparent sheet. The second type of first grid elements attenuates the intensity of transmitted light to a lower level than the first type of first grid elements; here, the first type of first grid elements is transparent—shown in white—and the second type of first grid elements is opaque—shown in black. The first and second types of first grid elements are distributed stochastically and at a ratio of approximately 50:50, so that the number of opaque grid elements applied to the first medium is approximately equal to the number of transparent grid elements. Although stochastic, the distribution of the first and second types of first grid elements defines a key.

Figure 2:
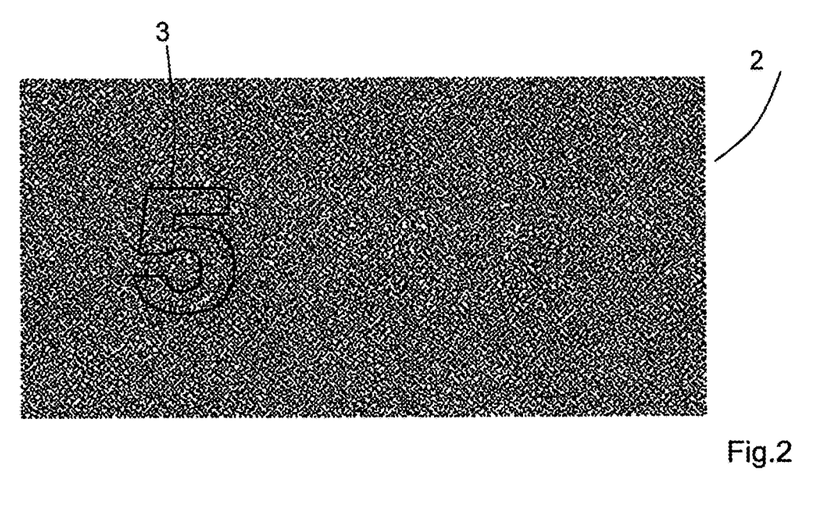
FIG. 2 shows a second grid.

A second grid is then applied to a second medium. Such a second grid 2 is shown in FIG. 2. This grid consists of a first type of second grid elements and a second type of second grid elements. The second grid elements have essentially the same lateral dimensions—i.e., in length (or height) and width—as the first grid elements. Also, the first type and the second type of second grid elements, when illuminated, modify in different ways at least one property of the light used for illumination; the second grid elements, too, can be made transparent to light or radiate illuminating light in varied ways, e.g., reflect or disperse it, and with varied degrees of attenuation at that. The second grid 2 can be applied to a dynamic second medium, i.e., a triggerable display screen capable of varying this second grid 2. Alternatively, it can be of a static design, as is the case in this example. The second medium can then be paper or some other printable material on which the second grid is printed. In the present case, the first type of second grid elements is white, and the second type of second grid elements is black. Transparent and opaque pixels of a screen can likewise be used, though.

In the second grid 2, then, at least one coherent area is selected, the contour of which defines an item of information. FIG. 2 illustrates this for an exemplary contour 3 representing the digit "5". The contour 3 encloses the at least one coherent area. However, someone looking at the second grid 2 alone will not see this contour 3, which serves merely for illustration here. Further coherent areas defined in the second grid 2, the contours of which define information, are not shown here.

The first and second types of second grid elements in the second grid 2 are distributed depending on the distribution of the first grid elements in the first grid 1. For example, the distribution can be effected thus: With a predefined mutual alignment of the two grids 1 and 2 (which may first, with the two grids not yet superimposed, be done merely in the mind and in case of static grids be actually executed later, e.g., by means of marks provided outside the grid, such as a frame), outside the at least one coherent area a first grid element of the second type corresponds to a second grid element of the first type and a first grid element of the first type corresponds to a second grid element of the second type. Outside the at least one coherent area, then, an opaque first grid element on the first grid 1 corresponds to a white second grid element on the second grid 2. A transparent first grid element on the first grid 1 corresponds to a black second grid element on the second grid 2. Outside the at least one coherent area, if the two grids 1 and 2 are superimposed in compliance with the predefined alignment, a transparent grid element of the first grid 1 lies over or underneath a black grid element of the second grid 2, and an opaque grid element of the first grid 1 lies over or underneath a white grid element of the second grid 2. Accordingly, this area looks dark, almost black. Within the at least one coherent area, things are exactly to the contrary: a first grid element of the second type corresponds to a second grid element of the second type, and a first grid element of the first type corresponds to a second grid element of the first type. In this case, then, a transparent grid element of the first grid 1 corresponds to a white grid element of the second grid 2, and an opaque grid element of the first grid 1 corresponds to a black grid element of the second grid 2. Within this area, then, a transparent grid element of the first grid 1 lies over or underneath a white grid element of the second grid 2, and an opaque grid element of the first grid 1 lies over or underneath a black grid element of the second grid 2. Compared with the distribution of the individual grid, nothing changes here, so that the at least one coherent area looks brighter than its surroundings.

Alternatively, the distribution can be done exactly the other way round, in such a way that the assignment described above for the coherent area is applied to the grid elements outside this area, and the assignment described above for the correspondence outside the coherent area is applied inside the coherent area. It is important only that one of the two assignment rules described is applied within, and the other one outside the coherent area.

Figure 3:
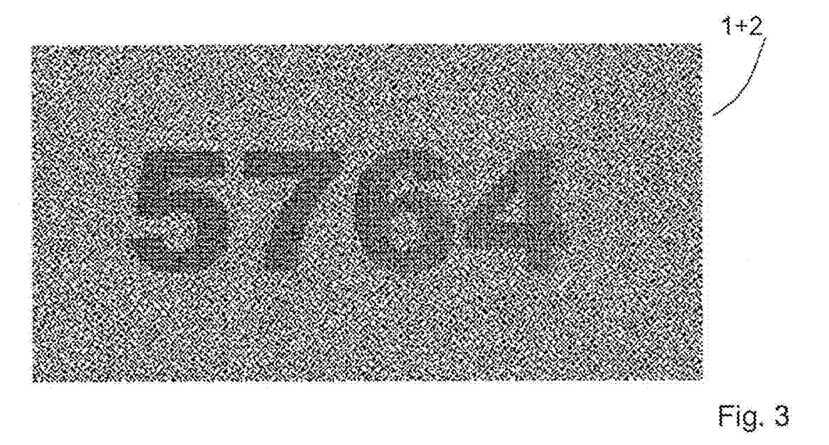
FIG. 3 shows the superimposition of the first and the second grid.

An example with the inverted distribution is shown in FIG. 3. Here, within the coherent area, a transparent grid element of the first grid 1 corresponds to a black grid element of the second grid 2, and an opaque grid element of the first grid 1 corresponds to a white grid element of the second grid 2, so that the presentation within the coherent area looks darker. Here, the information is perceived by virtue of the difference in contrast or brightness created by the superimposition.

To the recipient, the first grid 1 is made accessible on a first transmission path, and the second grid on a second transmission path. At the recipient's end, the first and the second grid are superimposed in mutual alignment, as shown in FIG. 3. The information then becomes visible due to a difference in contrast or brightness between the at least one coherent area and its surroundings. In the case of dynamic grids it is possible, e.g., to send one of the grids by MMS or e-mail and to have the recipient download the other one from a server on the internet. Also, one grid can be sent by MMS or SMS, or as metainformation with subsequent conversion by means of a software application, and the other grid by e-mail. Further, one of the two grids may be of a static design, e.g., in the form of a filter that is permanently or detachably mounted to the screen of a mobile phone or a computer. Also, both grids can be of static design, such as in the case of sending PINs: The recipient is first sent the medium with one of the grids and subsequently the medium with the other grid. Here, the two transmission paths differ at least in time, as the media are sent at different times. The transmission paths can also differ in location and/or in type, if different media or different kinds of transmission are used for transmitting the grids.

Preferably, the first medium is sent via a postal service, whereas the second medium is, e.g., printed by the recipient on paper after a download or after the receipt of an e-mail with an image file. Favorably, both media should be made accessible to the recipient at the same time or at least on the same day.

Figure 4:
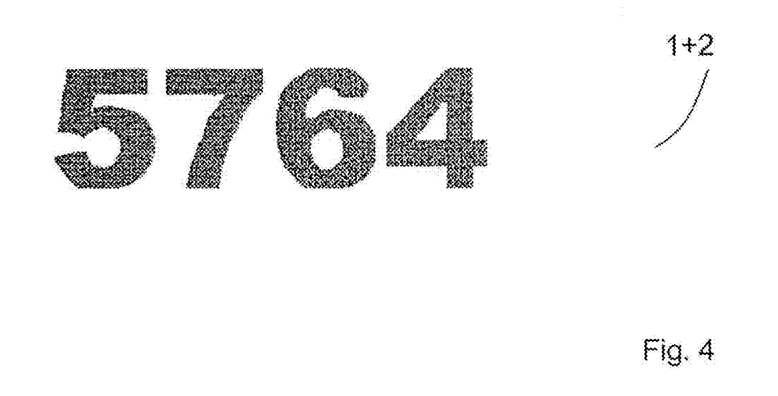
FIG. 4 shows an adjusted version of the superimposition shown in FIG. 3.

Finally, FIG. 4 shows a version of the superimposition of the first and the second grid shown in FIG. 3, adjusted for the marginal condition that, in every row and/or every column and/or every diagonal between a row and a column, the number of adjacent grid elements of the same type must not exceed a specified maximum. Here, the distribution of the first grid elements of the first and second types has been produced in compliance with an appropriate marginal condition. Accordingly, the contrast has been enhanced further, by setting the color values assigned to the pixels to a uniform background color value—in this case "white"—in such image areas of the composite image according to FIG. 3 in which the marginal condition is satisfied even after superimposition of the two grids. "White" distinctly differs from the color value of the pixels in the at least one coherent area of the composite image, so that the PIN can be seen here particularly clearly and, with regard to image contrast, better than in FIG. 3. This contrast improvement can preferably be implemented with dynamic grids alone; although it is also possible to deactivate suitable segments in static grids, say, by erasing, as soon as the intended recipient has received both grids.

By the method described above, sensitive items of information such as PINS, TANs or OTPs, passwords or entire texts can be transmitted to a selected recipient in encrypted form, so that only that selected recipient, having received both the first grid as a key and the second grid containing the information, is in a position to actually read the information.

The advantages of the invention compared to prior art are many-sided. Clients of financial institutions have so far been delivered their bank or credit cards with a delay after delivery of their PIN number. The invention makes it generally possible for the recipient to obtain both his/her bank or credit card and the PIN on the same day, and with a reduction in cost at that, due to on-line transmission of the second grid. The customary expensive fraud protection on the plain-text PIN becomes superfluous, which is another cost-diminishing factor. Finally, the transmission is distinctly more secure than in prior art, since the PIN will never be transmitted as plain text, and since theft of only one grid does not readily disclose the PIN information. In the field of mobile TANs/OTPs, too, the invention leads to clearly higher security.

LIST OF REFERENCE NUMBERS 1 first grid
2 second grid
3 coherent area

What is claimed is:

1. A method for the secure transmission of encrypted information and for visualization by a specified recipient, wherein
   a first grid consisting of a first type of first grid elements and a second type of first grid elements is applied to a first medium,
   with the first type and the second type of first grid elements modifying at least one property of transmitted light in different ways,
   with a key-defining distribution of the first and the second type of the first grid elements being effected in a statistical fashion and approximately at a ratio of 50:50, and wherein
   a second grid consisting of a first type of second grid elements and a second type of second grid elements is applied to a second medium, with the second grid elements having essentially the same lateral dimensions as the first grid elements,
   with the first type and the second type of second grid elements, when illuminated, modifying in different ways at least one property of the light used for illumination,
   with at least one coherent area being defined in the second grid, the contour of which area defining an item of information, and wherein
   the distribution of the first type and the second type of second grid elements is effected as a function of the distribution of the first grid elements in the first grid in such a way that, with a predefined alignment of the two grids relative to each other, a first grid element of the second type corresponds to a second grid element of the first type and a first grid element of the first type corresponds to a second grid element of the second type outside the at least one coherent area, and a first grid element of the second type corresponds to a second grid element of the second type and a first grid element of the first type corresponds to a second grid element of the first type within the at least one coherent area, or vice versa, and wherein
   the first grid is made accessible to the recipient on a first transmission path, and the second grid is made accessible to the recipient on a second transmission path, and wherein
   at the recipient's end, the first and the second grid are superimposed in mutual alignment, so that the information becomes visible due to the difference, created as a function of the differing modifications, between the at least one coherent area and the surroundings.

2. The method as claimed in claim 1, wherein the key-defining statistical distribution of the first type and the second type of first grid elements in rows and columns is carried out with the marginal condition that, in each row and/or each column and/or each diagonal between a row and a column, the number of adjacent grid elements of the same type must not exceed a specified maximum and/or not fall short of a specified minimum.

3. The method as claimed in claim 2, wherein different maxima are specified for different areas of the grid.

4. The method as claimed in claim 2, wherein the specified maximum is specified as a function of the lateral extension of a single grid element and a specified viewing distance of the recipient.

5. The method as claimed claim 1, wherein the first type and the second type of first grid elements modify the intensity, the polarization, the direction of light propagation and/or the spectral range of transmitted light in different ways.

6. The method as claimed in claim 1, wherein the first type and the second type of second grid elements, when illuminated, modify in different ways the intensity, the polarization and/or the spectral range of the light used for illumination.

7. The method as claimed in claim 6, wherein the second type of first grid elements attenuates the intensity of transmitted light to a lower level than does the first type of first grid elements.

8. The method as claimed in claim 1, wherein a transparent sheet, preferably a photographic film, is used as the first medium.

9. The method as claimed in claim 7, wherein the first type of first grid elements is transparent, and the second type of first grid elements is opaque.

10. The method as claimed in claim 1, wherein a display screen, on which the second grid is presented, is used as the second medium.

11. The method as claimed in claim 10, wherein the second type of second grid elements attenuates the intensity of the light to a lower level than does the first type of second grid elements, so that the first type of second grid elements, when illuminated, looks brighter than the second type of second grid elements.

12. The method as claimed in claim 11, wherein pixels or subpixels, switched to be transparent, are used for implementing the first type of second grid elements, and pixels or subpixels of the display screen, switched to be opaque, are used for implementing the second type of second grid elements.

13. The method as claimed in claim 1, wherein paper or some other printable material on which the second grid is printed is used as the second medium.

14. The method as claimed in claim 13, wherein the first type of second grid elements is made to be white, and the second type of second grid elements is made to be black.

15. The method as claimed in claim 1, wherein the first medium with the first grid applied to it is made accessible to the recipient on the first transmission path, and the second medium with the second grid applied to it is made accessible to the recipient on the second transmission path.

16. The method as claimed in claim 1, wherein the first medium is a first image file and the second medium is a second image file of equal dimensions in terms of pixels, with each pixel being assigned a color value, and, at the recipient's end, with the two image files being superimposed in a pixel-by-pixel additive or subtractive mode and in mutual alignment, resulting in a composite image.

17. The method as claimed in claim 16, wherein in such image areas of the composite image in which the marginal condition is satisfied, the color values assigned to the pixels are set to a uniform background color value, which deviates from the color value of the pixels in the at least one coherent area of the composite image.

18. The method as claimed in claim 1, wherein the information to be transmitted, as far as it is transmitted electronically, is first encrypted with another key, and decrypted with this other key before or during the application of the information to the second grid.

19. The method as claimed in claim 1, wherein the first and the second transmission path selected are different, and/or the transmissions are executed with a time interval between them.

20. The method as claimed in claim 1, wherein the first grid is a medium that is transmitted via a first transmission path, either integrated into a bank or credit card, or together with the same.

21. The method as claimed in claim 1, wherein a TAN/OTP or PIN encrypted in the second grid is transmitted as metainformation in the form of one or several SMSs, and, by a software application at the recipient's end, is made available as an image file displayable on a screen.

22. The method as claimed in claim 1, wherein the grid elements of at least one of the two grids are scaled essentially to the size of the grid elements of the respective other grid in case the grid elements of the two grids differ in size due to the transmission and/or display paths.

* * * * *